United States Patent

Akkapeddi et al.

Patent Number: 5,552,463
Date of Patent: Sep. 3, 1996

[54] SEMICRYSTALLINE BLENDS OF POLYALKYLENE TEREPHTHALATES AND POLYARYLATES

[75] Inventors: Murali K. Akkapeddi, Morristown; Seng-Shiu Chung, Randolph, both of N.J.

[73] Assignee: AlliedSignal Inc., Morris Township, N.J.

[21] Appl. No.: 451,344

[22] Filed: May 26, 1995

Related U.S. Application Data

[63] Continuation of Ser. No. 874,261, Apr. 24, 1992, abandoned.

[51] Int. Cl.$^6$ .......................... C08L 67/02; C08L 67/03
[52] U.S. Cl. .................. 524/98; 524/86; 524/99; 524/102; 524/104; 524/105; 524/147; 524/151; 524/153
[58] Field of Search ................ 525/444; 524/151, 524/153, 98, 99, 102, 104, 105, 86

[56] References Cited

U.S. PATENT DOCUMENTS

| | | |
|---|---|---|
| 3,133,898 | 5/1964 | Keck . |
| 3,317,464 | 5/1967 | Conix et al. . |
| 3,756,986 | 9/1973 | Russell . |
| 3,756,987 | 9/1973 | Winuick . |
| 3,756,988 | 9/1973 | Kollar . |
| 3,780,148 | 12/1973 | Jackson et al. . |
| 3,948,856 | 4/1976 | Stackman . |
| 4,259,458 | 3/1981 | Robeson . |
| 4,568,720 | 2/1986 | Aharoni et al. . |
| 4,680,371 | 7/1987 | Rosenfeld ............... 528/179 |
| 5,037,897 | 8/1991 | Glans et al. . |

FOREIGN PATENT DOCUMENTS

| | | |
|---|---|---|
| 0054308 | 6/1982 | European Pat. Off. . |
| 199841 | 8/1989 | Japan . |
| 201326 | 8/1989 | Japan . |
| 1002545 | 4/1964 | United Kingdom . |
| 8803156 | 5/1988 | WIPO ................... 524/537 |

OTHER PUBLICATIONS

Journal of Applied Polymer Science, vol. 42, 489–493 (1991).
Journal of Applied Polymer Science, vol. 30, 4081–4098 (1985), Phase Behavior of Polyarylate Blends.

*Primary Examiner*—Patricia A. Short
*Attorney, Agent, or Firm*—Michele G. Mangini; Roger H. Criss

[57] ABSTRACT

A miscible blend composition having high $T_g$ and good chemical resistance comprising, based on the total weight of the composition, from about 30 to about 90 weight % of a polyalkylene terephthalate, from about 70 to about 10 weight % of a polyarylate polymer, and an effective amount of an ester-interchange inhibitor.

13 Claims, No Drawings

SEMICRYSTALLINE BLENDS OF POLYALKYLENE TEREPHTHALATES AND POLYARYLATES

This application is a continuation of application Ser. No. 07/874,261 filed Apr. 24, 1992, now abandoned.

BACKGROUND OF THE INVENTION

1. Field of the Invention

The present invention relates to miscible blends of polyalkylene terephthalates and polyarylates having a high glass transition temperature and crystallinity.

DESCRIPTION OF THE PRIOR ART

Semicrystalline polyalkylene terephthalates, such as polyethylene terephthalate and polybutylene terephthalate, are thermoplastic polyesters that are known for their outstanding mechanical and thermal properties and solvent resistance. Although polyalkylene terephthalates do not have an exceptionally high glass transition temperature ($T_g$), polyalkylene terephthalates maintain their physical integrity over a broad temperature range. Semicrystalline polymers, unlike amorphous polymers, do not loose their physical integrity at above their glass transition temperature. When a semicrystalline polymer is exposed to a temperature above its $T_g$, the crystalline structure of the polymer provides a reinforcement effect, extending the useful temperature range of the polymer. Semicrystalline polymers, having the rigid attribute of crystalline polymers, also exhibit a good solvent resistance.

Polyarylates are aromatic polyesters that are known for their high heat distortion temperature, excellent toughness, high resilience from deformation, and excellent mechanical property retention after long-term ultraviolet exposure and are suitable for use in high temperature applications, such as for ovenwares. However, polyarylates lack resistance to many organic solvents, such as paint solvents, automotive fluids, food additives and the like. In addition, polyarylates tend to be too expensive for large volume uses.

Certain applications, including steam sterilizable and retortable articles, e.g., food packaging, and under-the-hood automotive part applications, require that the polymer employed exhibits a high temperature dimensional stability that is beyond the $T_g$ of polyalkylene terephthalate and, yet, does not require overly engineered high temperature characteristics of costly aromatic polyesters. In such applications, it is desirable to provide a modified polyalkylene terephthalate that has an improved $T_g$ and yet retains its solvent resistance by preserving the semicrystalline structure of the polymer.

One possible approach in achieving such an increase in the $T_g$ of polyalkylene terephthalates is to blend the polymers with another polymer of higher $T_g$. Many attempts have been made in the art to form useful blends of polyalkylene terephthalates and polyarylates having a high $T_g$. As early as 1965, British Patent 1,002,545 disclosed an injection moldable polyester blend of a polyalkylene terephthalate and a copolymer of bisphenol A, terephthalic acid and isophthalic acid. However, it has recently been found that polyarylates do not readily form miscible blends with polyalkylene terephthalate and that the blends described in the prior art references, including the aforementioned British Patent, are not true blends. For example, Robeson, in his article titled "Phase Behavior of Polyarylate Blends" in Journal of Applied Polymer Science, Vol 30, 4081–4098 (1985), discloses that polyethylene terephthalates and aromatic polyesters do not form miscible blends when the content of polyethylene terephthalate is higher than 30 wt % of the total weight of the blend. The article further discloses that blends of the two polymers exhibit single-phase behavior when the polymer blends are processed at a higher temperature for an extended duration. Robeson states that the seemingly improved miscibility under such processing conditions is due to the ester-interchange reaction between the polyarylate and polyethylene terephthalate, forming an amorphous block copolymer of the two polymers.

The blends of polyalkylene terephthalates and aromatic polyesters that are reported in the prior art have disadvantages in that the prior art blend compositions result in either amorphous copolymers or unstable blends that are susceptible to ester-interchange reaction to form amorphous copolymers during the post-blending fabrication processes such as various molding processes. The copolymerization of the two polymers is not desirable in that the physical integrity of the copolymer is limited to its $T_g$ since the resulting copolymer does not retain the crystalline structure. On the contrary, the physical integrity of a stable blend is extended to its crystalline melting temperature ($T_m$), which is substantially higher than the $T_g$. Furthermore, it is known in the art that a blend of two or more of compatible polymers tends to retain most of the inherent properties of the component polymers, whereas a copolymer tends to exhibit averages of the inherent properties.

Japanese Patent Publication (Kokai) No. 201326 published in 1989 discloses homopolymers and copolymers of resorcinol isophthalate that are stated as having an excellent gas barrier property and a good heat resistance. The patent mentions that the resorcinol isophthalate polymers, which include copolymers of resorcinol isophthalate having at least 60 mol % of resorcinol isophthalate units, can form miscible blends with up to 50 wt % of polyethylene terephthalate. However, this document does not recognize the benefits of maintaining the crystalline structure of the blend. Furthermore, the patent publication does not distinguish miscible blends from copolymer compositions that would result therefrom; i.e, it does not distinguish blends that retain crystallinity from copolymers that cannot have crystalline structure. As such, the patent publication does not attempt to consider the effects of the ester-interchange reaction that would occur during blending and post-blending application processes.

It is, therefore, desirable to provide miscible blends of polyalkyene terephthalates and polyarylates that are not susceptible to the ester-interchange reaction and retain the crystalline structure.

SUMMARY OF THE INVENTION

In accordance with the present invention, there is provided a composition comprising, based on the total weight of the composition, a blend of from about 30 to about 90 weight % of a polyalkylene terephthalate; from about 70 to about 10 weight % of a polyarylate polymer of the formula:

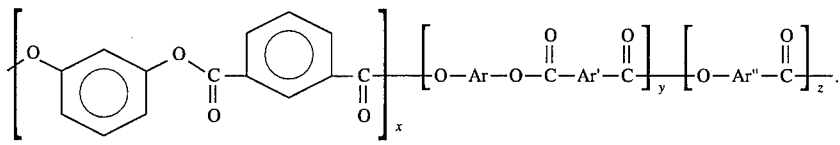

wherein the —O—Ar—O— represents units derived from an aromatic diol, the —CO—Ar'—CO— represents units derived from a dicarboxylic acid, the —O—Ar"—CO— represents units is derived from a hydroxy benzoic acid, $x \geq 0.5$, $y \leq 0.5$, $z \leq 0.5$, and $x+y+z=1$; and an effective amount of an ester exchange reaction inhibitor. Unexpectedly, it has been found that the miscible blend composition of the present invention retains the semicrystalline structure of polyalkylene terephthalates, and provides a high $T_g$ and an improved solvent resistance.

DETAILED DESCRIPTION OF THE INVENTION

As mentioned above, the composition of the present invention comprises, based on the total weight of the composition, a blend from about 30 to about 90 wt %, preferably from about 50 to about 80 wt %, of a polyalkylene terephthalate, from about 70 to about 10 wt %, preferably from about 50 to about 20 wt %, of a polyarylate polymer, and an effective amount of an ester-interchange reaction inhibitor.

The polyarylate polymers suitable for use in of the present invention are resorcinol isophthalate polymers which have the following formula:

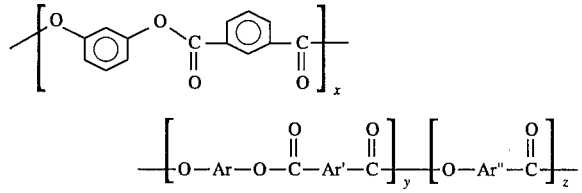

wherein the —O—Ar—O— represents units derived from an aromatic diol, the —CO—Ar'—CO— represents units derived from a dicarboxylic acid, the —O—Ar"—CO— represents units derived from a hydroxy benzoic acid, $x \geq 0.5$, $y \leq 0.5$, $z \leq 0.5$, and $x+y+z=1$.

The preferred aromatic diols suitable for use herein are selected from the group consisting of bisphenol-A; tetramethyl bisphenol-A; tetrabromo bisphenol-A; hexafluoro biphenol-A; 2,2-bis(4-hydroxyphenyl)pentane; 2,4'-(dihydroxydiphenyl)methane; bis-(4-hydroxyphenyl)methane; bis-(2-hydroxyphenyl)methane; bis-(4-hydroxy-5-nitrophenyl)methane; 1,1-bis(4-hydroxyphenyl)ethane; 3,3-bis(4-hydroxyphenyl)pentane; 2,2-dihydroxydiphenyl; 2,6-dihydroxynaphthalene; bis-(4-hydroxydiphenyl)sulfone; bis(3,5-dimethyl-4-hydroxyphenyl)propane; 2,4'-dihydroxydiphenyl sulfone; 5'-chloro-2,4'-dihydroxydiphenyl sulfone; bis-(4-hydroxyphenyl)diphenyl sulfone; 4,4'-dihydroxydiphenyl ether; 4,4'-dihydroxy-3,3'-dichloro-diphenyl ether; 4,4'-dihydroxy-2,5'-dihydroxydiphenyl ether; 4,4'-thiodiphenol; 4,4'-dihydroxy diphenyl indan; phenolphthalein; hydroquinone; substituted hydroquinone, such as 2-methyl hydroquinone, t-butyl hydroquinone and phenol hydroquinone; 4,4'-biphenol; 3,3'-5,5'-tetramethyl 4,4'-biphenol; tertabromo biphenol; and the like.

The preferred dicarboxylic acids suitable for use herein are selected from the group consisting of aromatic dicarboxylic acids having 7 to 20 carbon atoms. Illustrative of the suitable aromatic dicarboxylic acids are terephthalic acid; isophthalic acid; 2,6-naphthalene dicarboxylic acid; t-butyl isophthalic acid; 3-(4-carboxyphenyl)-1,1,3-trimethyl-5-indan carboxylic acid; 4,4'-bibenzoic acid; substituted terephthalic acid such as tetrabromo terephthalic acid; and the like.

The preferred hydroxy benzoic acids suitable for use herein are selected from the group consisting of p-hydroxy benzoic acid, m-hydroxy benzoic acid, salicylic acid, and the like.

The polyarylate polymers of the present invention can be made in accordance with any known polyester forming reaction, such as the reaction of the acid chloride or acetate of the aromatic dicarboxylic acid with the dihydric phenol, the reaction of the diaryl ester of the aromatic dicarboxylic acid with a dihydric phenol, and the reaction of the aromatic diacid a with diester derivative of the dihydric phenol. These processes are described, for example, in U.S. Pat. Nos. 3,317,464; 3,948,856; 3,780,148 and 3,133,898. The preferred resorcinol isophthalate copolymers of the present invention have a reduced viscosity of at least 0.3 dl/g and preferably as measured in ochlorophenol at 27°.

The preferred polyalkylene terephthalates suitable for use in conjunction with the present invention includes homopolymers and copolymers of ethylene terephthalate, butylene terephthalate, and blends thereof. The suitable copolymers of alkylene terephthalate preferably have less than about 10 mol % of other comonomers including dicarboxylic acids and diols. Specific examples of the comonomers include aromatic dicarboxylic acids, such as isophthalic acid, naphthalene dicarboxylic acid, diphenyl dicarboxylic acid, diphenoxy ethane dicarboxylic acid, diphenyl ether dicarboxylic acid, diphenyl sulfone dicarboxylic acids, diphenyl ketone dicarboxylic acid, sodium sulfo isophthalic acid, dibromo terephthalic acid, and the like; alicyclic dicarboxylic acids, such as decaline dicarboxylic acid, hexa hydroxy terephthalic acid, and the like; aliphatic dicarboxylic acids, such as malonic acid, succinic acid, adipic acid, fumaric acid, and the like; aliphatic diols, such as trimethylene glycol, tetramethylene glycol, hexamethylene glycol, neopentyl glycol, diethylene glycol, and the like; aromatic diols, such as hydroquinone, catechol, naphthalene diol, bisphenol A, bisphenol S, tetrabromo bisphenol A, bishydroxy ethoxy bisphenol A, and the like; alicyclic diols, such as cyclohexane diol, and the like; aliphatic oxy carboxylic acids, such as glycolic acid, hydroacrylic acid, and the like.

The suitable polyalkylene terephthalates may be formed by a transesterification reaction from suitable glycols and dimethyl terephthalate or by a direct esterification reaction under high temperature and elevated pressure from terephthalic acid and the glycols. U.S. Pat. Nos 3,756,986; 3,756,987; and 3,756,988 are examples of such direct esterification polymerization process. The preferred polyalkylene terephthalates suitable for use in conjunction with the present invention have a reduced viscosity of at least 0.3 dl/g as measured in a 60:40 phenol/tetrachloroethane mixture solvent at 27° C.

In accordance with the present invention, the blend composition of the present invention further comprises one or more of an ester-interchange inhibitor which is selected from the group consisting of phosphite-type inhibitors having the formula:

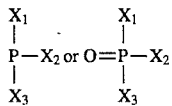

wherein $X_1$, $X_2$ and $X_3$ are the same or different and are selected from the group consisting of hydrogen, alkoxy, aryloxy, trialkyl silyl and lactamyl groups that are unsubstituted or substituted with one or more of alkyl, halogen, haloalkyl, nitro, cyano and isocyanato groups. Preferably, the alkoxy group has from about 1 to about 18 carbon atoms; examples include t-butoxy, n-butoxy, isopropoxy, hexoxy, 2-chloroethoxy, 3-chlorobutoxy, decoxy, dodecoxy and the like. Aryloxy group preferably has from about 6 to about 18 carbon atoms; examples include phenoxy, 2,4-dimethylphenoxy, 2,6-dimethylphenoxy, 2,4-di-tert-butylphenoxy, 4-tert-butylphenoxy, octylphenoxy, 4-nonylphenoxy, 4-chlorophenoxy, 2,4-dibromopheoxy, 4-fluoropheoxy, 3,5-dichlorophoxy, 4-cyanophenoxy, 2-nitrophenoxy and the like. Trialkyl silyl groups include trimethyl silyl, triethyl silyl, tripropyl silyl and the like. Lactamyl groups include pyrrolidonyl, caprolactamyl, laurylactamyl and the like such as are disclosed in commonly assigned U.S. Pat. No. 5,037,897. Glans et al. and commonly assigned, U.S. Pat. No. 5,118,805 filed on Apr. 22, 1991 to Glans et al. Of these ester-interchange inhibitors, the preferred are triphenyl phosphite, tricaprolactamyl phosphite, tris(p-nonylphenyl) phosphite, di-phenyl isodecyl phosphite and bis-(2,4-di-t-butylphenyl)-pentaerythritol diphosphite.

Preferably, the composition of the present invention contains, based on the total weight of the polymer contents exclusive of additives and fillers, from about 0.01 to about 5 weight percent of an ester-interchange inhibitor of the present invention, more preferably from about 0.05 to about 3 weight percent, most preferably from about 0.1 to about 2 weight percent.

The blend compositions of the present invention can be prepared by melt blending in a single or multi-screw extruder, such as a Werner Pfleiderer extruder having 2–5 kneading blocks, or other conventional plasticating devices, such as a Banbury mill or the like. Alternatively, the blends may be made by coprecipitation from solution, blending or by dry mixing together of the components followed by melt extrusion of the dry mixture.

The blend compositions of the present invention may be further modified by one or more conventional additives including heat stabilizers, coloring agents including dyes and pigments, flame-retardants, fibrous and particulate fillers and reinforcing agents (both organic and inorganic), nucleating agents, ultraviolet light stabilizers, plasticizers, lubricants, mold release agents, impact modifiers as well as other additives. These conventional additives may be incorporated into the compositions at any suitable stage of the production process; typically such conventional additives are included in the mixing step and included in an extrudate.

The addition of a nucleating agent in the blend composition of the present invention is particularly important when polyethylene terephthalate is present since the crystallization rate of polyethylene terephthalate is slow. The suitable nucleating agents for use in conjunction with the present invention include inert nucleating agents, such as talc and mica; alkali metal salts of carboxylic acids such as aliphatic monocarboxylic acids, aromatic carboxylic acids and dimers and trimers of saturated or unsaturated carboxylic acids; and the like. Examples include but not limited to the sodium or potassium salts of acrylic acid, ethylene acrylic acid copolymers, ethylene methacrylic acid copolymers, adipic acid, glutaric acid, succinic acid, citric acid, formic acid, caproic acid, oleic acid, linoleic acids, fumaric acid, maleic acid, glutamic acid and the like. Of these suitable nucleating agents, the preferred are talc, and the sodium salts of acrylic acid, ethylene acrylic acid copolymers and ethylene methacrylic acid copolymers.

It has been found that the compositions of the present invention form miscible blends that have an improved $T_g$ and, yet, do not undergo ester-interchange reaction to form copolymers. As such, the blend compositions of the present invention retain the crystalline structure of polyalkylene terephthalate and, therefore, can be utilized in a variety of applications that are exposed to a wide range of different temperature and chemical environments. Furthermore, it has been unexpectedly found that the polyarylate polymers of the present invention act as nucleators promoting the crystallization rate of the polyalkylene terephthalates in the blend composition, and that the nucleating effect is more evident as the content of aromatic diols other than resorcinol increases in the polyarylate polymer compositions.

The following non-limiting examples are given to further illustrate the invention, and the invention should not be considered as being limited to the details thereof.

EXAMPLES 1–3

Examples 1–3 illustrate that the miscible blends of the present invention not only exhibit enhanced $T_g$ but also retain the crystalline structure of polyalkylene terephthalate.

$T_{ch}$ is the temperature at which crystals begin to form upon heating an amorphous test specimen. Such amorphous test specimen is formed by quickly quenching a molten test composition. $T_g$, $T_{ch}$ and $T_m$ were measured using a Perkin-Elmar Differential Scanning Calorimeter (DSC), Model #4 at cooling and heating rates of 20° C./min.

Each example specimen having monomer contents as indicated in Table 1 was prepared by the following procedures. Equimolar amounts of appropriate diacids and diols, and 2.5 times the total amount of diacids of acetic anhydride were placed in a one-liter glass reactor equipped with a high torque stirrer. 0.05 mol % of Mg(OAc)$_2$ and 0.05 mol % of Ca(OAc)$_2$, based on the total content of the diacids, were added to the composition as catalysts. The polymerization was carried out in three stages under a constant, slow stream of nitrogen gas. The nitrogen gas stream was applied to prevent oxidative degradation of the monomers and to extract acetic acid, which is a byproduct of the polymerization reaction. First, the reaction was carried out at 170°–200° C. for 2 hours. Then, the reactor temperature was increased slowly to 300°–350° C. and held for 2 hours. Finally, vacuum was applied to the reactor for 30 minutes in order to extract any remaining acetic acid and unreacted acetic anhydride.

Each of the resulting polyarylate polymers were subsequently blended with a homopolymer of ethylene terephthalate (PET) having an intrinsic viscosity (I.V.) of 0.95 in a 1 to 1 weight ratio. Each PET/polyarylate blend specimen was prepared by melt-blending the composition in a Haake HBI rheometer at 290° C. in the presence of 0.5 weight percent based on the total weight of the polymer content of triphenyl phosphite (TPP), available from Aldrich Chemical Co. Inc., Wis., as the ester-interchange inhibitor.

Various DSC measurements including $T_g^a$ were measured, and the results are shown in Table 1. $T_g^a$ denotes the glass transition temperature taken on the example specimens that were annealed at 150° C. for two hours. Such annealing process was utilized since, as mentioned before, polyethylene terephthalate is known to have a slow crystallization rate, especially in the absence of any nucleating agent. The results are shown in Table 1.

Control 1

For Control 1, a homopolymer PET having an intrinsic viscosity (I.V.) of 0.95. The thermal properties of Control 1 (C1) are shown in Table 1.

TABLE 1

| | Polyarylate Polymer | | | | | PET/polyarylate Blend | | | | |
|---|---|---|---|---|---|---|---|---|---|---|
| | Monomer Content | | | | | | | | | |
| | (mol %) | | | | $T_g$ | PET Content | $T_g$ | $T_g^a$ | $T_{ch}$ | $T_m$ |
| Example | IPA | TPA | R | BPA | (°C.) | (Wt %) | | (C.°) | | |
| 1 | 50 | — | 25 | 25 | 168 | 50 | 106 | 125 | 189 | 241 |
| 2 | 50 | — | 30 | 20 | 155 | 50 | 108 | 116 | — | 221 |
| 3 | 50 | — | 50 | — | 150 | 50 | 109 | 106 | — | 232 |
| C1 | — | — | — | — | — | 100 | 83 | 87 | 178 | 255 |

IPA: isophthalic acid
TPA: terephthalic acid
R: resorcinol
BPA: bisphenol A

Examples 1–3 show that the PET/polyarylate blend of the present invention has an improved $T_g$ over PET itself, while retaining the crystallinity of PET as indicated by the presence of $T_{ch}$ and/or $T_m$. The $T_g^a$ results further demonstrate that the compositions of the present invention are blend compositions that do not interfere with the crystallinity of the PET phase in the blend.

EXAMPLE 4

Example 4 illustrates that the addition of the ester-interchange inhibitors of the present invention prevents the copolymerization of PET/polyarylate blends compositions.

A homopolymer of bisphenol A and isophthalic acid (in 50:50 mole ratio) was prepared and blended with PET of 0.71 I.V. containing 2 weight % of a low molecular weight ionomer of ethylene acrylic acid copolymer neutralized with sodium (Aclyn® 285, available from Allied-Signal Inc.), as a nucleating agent, in a 1:1 weight ratio in accordance with the procedures outline in Example 1, except that tricaprolactamyl phosphite was used as the ester-interchange inhibitor.

Tricaprolactamyl phosphite was synthesized by the following procedure. 98.1 grams (0.867 mol) of caprolactam, 128 ml (0.918 mol) of triethylamine and 600 ml of dry tetrahydrofuran were placed into a 2-liter three-necked flask fitted with a mechanical stirrer and a reflux condenser under a nitrogen sweep. A 10% solution of 25.2 ml (0.286 mol) of phosphorous trichloride in diethyl ether was added in a dropwise manner to the contents of the flask at room temperature, as the contents of the flask were stirred. During the addition of phosphorous trichloride, the formation of a white precipitate was noted. 200 ml of water was added to the reaction mixture after it was stirred at room temperature for three hours.

The resulting suspension was transferred to a 2-liter separatory funnel to separate the organic phase form the inorganic phase. The recovered organic phase which contained the white precipitate was washed three times with water, then once with a 10% $K_2CO_3$ aqueous solution. The white precipitate was collected by filtering the washed organic phase and, then, was washed with tetrahydrofuran at 20° C. The resulting tricaprolactamyl phosphite was dried over $P_2O_5$ under a vacuum.

The DSC measurement results are shown in Table 2.

Control 2

A test specimen was prepared in accordance with the procedure outlined in Example 4, except that no ester-interchange inhibitor was added to the composition. The DSC measurement results are shown in Table 2 under C2.

TABLE 2

| | Polyarylate Polymer Monomer Content | | | PET/polyarylate Blend | | | |
|---|---|---|---|---|---|---|---|
| | (mol %) | | | PET Content | $T_g$ | $T_{ch}$ | $T_m$ |
| Example | IPA | R | BPA | (Wt %) | | (C.°) | |
| 4 | 50 | 25 | 25 | 50 | 91 | 174 | 241 |
| C2 | 50 | 25 | 25 | 50 | 96 | NF | NF |

NF: not found

Unlike Example 4, Control 2 did not exhibit $T_{ch}$ and $T_m$, indicating that the composition underwent ester-interchange reaction and formed an amorphous copolymer. As such, Table 2 illustrates that PET/polyarylate blends are susceptible to ester-interchange reaction in the absence of the ester-interchange inhibitors of the present invention.

The above Examples demonstrate that the blend compositions of the present invention exhibit a high $T_g$ while retaining the crystalline characteristics of the polyalkylene terephthalates, making the blend compositions suitable for a wide range of applications, including injection and extrusion molded parts, and film applications, that are utilized in a broad spectrum of varied temperature and chemical environments.

What is claimed is:

1. A miscible blend composition comprising, based on the total weight of the composition, a blend of:

from about 30 to about 90 weight % of polyalkylene terephthalate;

from about 70 to about 10 weight % of polyarylate of the formula:

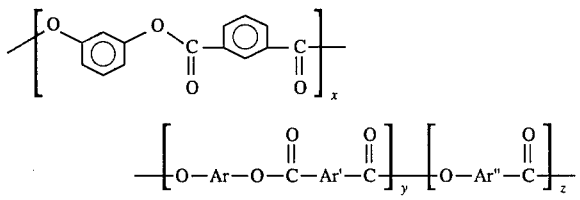

$$\left[O-Ar-O-\overset{O}{\underset{\|}{C}}-Ar'-\overset{O}{\underset{\|}{C}}\right]_y \left[O-Ar''-\overset{O}{\underset{\|}{C}}\right]_z$$

wherein the —O—Ar—O— represents units derived from an aromatic diol, the —CO—Ar'—CO— represents units derived from a dicarboxylic acid, the —O—Ar''—CO— represents units derived from a hydroxy benzoic acid, x is greater than or equal to 0.5, y is less than or equal to 0.5, z is less than or equal to 0.5, and x+y+z=1; and an effective amount of a ester-interchange inhibitor selected from the group consisting of inhibitors having the formula:

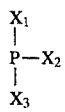

wherein $X_1$, $X_2$, and $X_3$ are lactamyl groups, and wherein said lactamyl groups are unsubstituted or substituted with one or more alkyl groups.

2. The composition according to claim 1, wherein said polyalkylene terephthalate is selected from the group consisting of homopolymers and copolymers of ethylene terephthalate, butylene terephthalate and blends thereof.

3. The composition according to claim 1, wherein said polyalkylene terephthalate is selected from the group consisting of homopolymers and copolymers of ethylene terephthalate.

4. The composition according to claim 1, wherein said aromatic diol is selected from the group consisting of bisphenol-A; tetramethyl bisphenol-A; tetrabromo bisphenol A; hexafluoro biphenol-A; 2,2-bis(4-hydroxyphenyl)pentane; 2,4'-(dihydroxydiphenyl)methane; bis-(4-hydroxyphenyl)methane; bis-(2-hydroxyphenyl)methane; bis-(4-hydroxy-5-nitrophenyl)methane; 1,1-bis(4-hydroxyphenyl)ethane; 3,3-bis (4-hydroxylphenyl)pentane; 2,2-dihydroxydiphenyl; 2,6-dihydroxynaphthalene; bis-(4-hydroxydiphenyl)sulfone; bis-(3,5-dimethyl-4-hydroxyphenyl)propane; 2,4'-dihydroxydiphenyl sulfone; 5'-chloro-2,4'-dihydroxydiphenyl sulfone; bis-(4-hydroxyphenyl)diphenyl sulfone; 4,4'-dihydroxydiphenyl ether; 4,4'-dihydroxy-3,3'-dichlorodiphenyl ether; 4,4'-dihydroxy-2,5'-dihydroxydiphenyl ether; 4,4'-thiodiphenol; 4,4'-dihydroxy diphenyl indan; phenolphthalein; hydroquinone; 2-methyl hydroquinone, t-butyl hydroquinone and phenol hydroquinone; 4,4'-biphenol 3,3'-5,5'-tetramethyl 4,4'-biphenol; and tertabromo biphenol.

5. The composition according to claim 1, wherein said dicarboxylic acid is selected from the group consisting of terephthalic acid; isophthalic acid; 2,6-naphthalene dicarboxylic acid; t-butyl isophthalic acid; 3-(4-carboxyphenyl)-1,1,3-trimethyl-5-indan carboxylic acid; 4,4'-bibenzoic acid; and tetrabromo terephthalic acid.

6. The composition according to claim 1, wherein said hydroxy benzoic acid is group consisting of p-hydroxy benzoic acid, m-hydroxy benzoic acid, and salicylic acid.

7. The composition according to claim 1, wherein said lactamyl group is selected from the group consisting of pyrrolidonyl, caprolactamyl, and laurylactamyl.

8. The composition according to claim 1, wherein said ester-interchange inhibitor is present from about 0.01 to about 5 weight percent based on the total weight of the polymer contents.

9. The composition according to claim 8, wherein said ester-interchange inhibitor is present from about 0.05 to about 3 weight percent based on the total weight of the polymer contents.

10. The composition according to claim 9, wherein said ester-interchange inhibitor is present from about 0.1 to about 2 weight percent based on the total weight of the polymer contents.

11. The composition according to claim 1, wherein said composition further comprises a nucleating agent.

12. The composition according to claim 11, wherein said nucleating agent is selected from the group consisting of talc, and the sodium salts of acrylic acid, ethylene acrylic acid copolymers and ethylene methacrylic acid copolymers.

13. A composition comprising, based on the total weight of the composition, a blend of:

from about 30 to about 90 weight % of polyethylene terephthalate;

from about 70 to about 10 weight % of polyarylate of the formula:

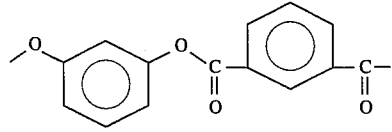

and an effective amount of an ester-interchange inhibitor selected from the group consisting of inhibitors having the formula:

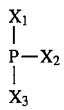

wherein $X_1$, $X_2$, and $X_3$ are lactamyl groups, and wherein said lactamyl groups are unsubstituted or substituted with one or more alkyl groups.

* * * * *